Patented Aug. 31, 1926.

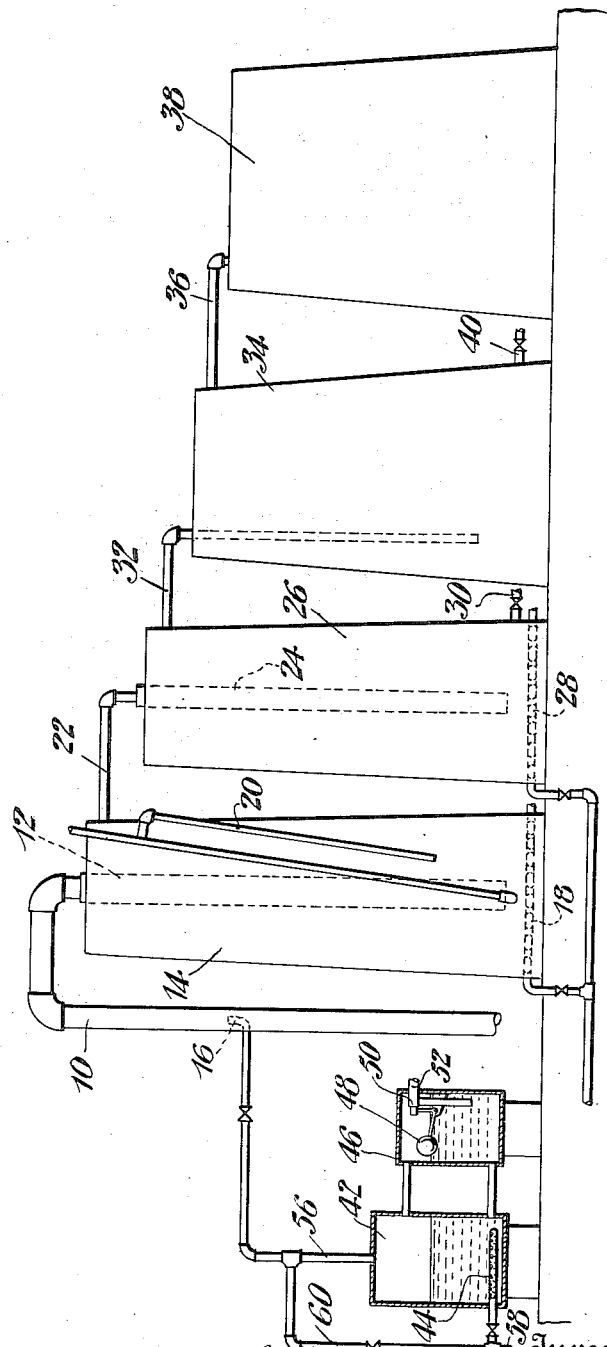

1,597,700

UNITED STATES PATENT OFFICE.

JOHN CHARLES WALKER, OF ELDORADO, KANSAS, ASSIGNOR TO DOHERTY RESEARCH COMPANY, OF NEW YORK, N. Y., A CORPORATION OF DELAWARE.

BREAKING OF OIL-WATER EMULSIONS.

Application filed December 5, 1921. Serial No. 519,844.

This invention relates to the breaking of oil-water emulsions, and more particularly to a method of treating petroleum oil containing an emulsion of oil and water to break the emulsion and separating the water from the oil.

The petroleum oil producing strata in most localities have water or brine associated with the oil. When the brine is agitated with the oil, as is commonly done by pumps, particularly defectively operating pumps, an oil-water emulsion is formed. The brine forms the disperse phase of the emulsion and is distributed in the oil as particles varying in size from large drops to those of microscopic size, the particles being surrounded by a film of oil.

The presence of emulsion in petroleum oil is undesirable because the wet oils or oils containing emulsion cannot be distilled or refined with the water in them. The presence of water in the oil undergoing distillation causes the stills to froth and the froth contaminates the distillates. Accordingly, the refineries and pipe line companies refuse to buy oil which has more than a predetermined amount of oil-water emulsion in it.

The oil-water emulsions formed from petroleums in different localities vary quite widely and the different emulsions do not respond to the same treatment. Furthermore, emulsions which have accumulated in tank bottoms or in open ponds which are commonly known as B S or bottom settlings, become very permanent emulsions and are very resistant to any treatment or treating reagent by which they are to be broken. This is particularly so of mixed base oils which are found in the mid-continent district of the United States in Oklahoma and Kansas. Many investigations of these emulsions appear to indicate that the difference in the emulsions formed in the different localities depends more on the different characters of oils than upon the different characters of the brines associated with the oils.

The object of the present invention is to provide a method by which the most resistant and permanent petroleum oil-water emulsions may be effectively and inexpensively broken.

Experience with the commercial dehydration of large amounts of oil appears to indicate that the treating reagents which might be called chemical treating agents for breaking down emulsions do not in fact always act chemically in breaking the emulsions. For example, some emulsions may be effectively broken by means of agents that do not enter into combination with the constituents of the emulsion. Also, other treating agents which are capable of entering into chemical combination with one or more of the constituents of the emulsion are not used in sufficient quantities, and do not need to be used in sufficient quantities, to enter into chemical combination with all of the one or more constituents of the emulsion, with which they are capable of reacting, in order to effectively break the emulsion. Experience has also shown that the effectiveness of the breaking of emulsions by treating agents depends upon the thoroughness by which the emulsion is brought into physical contact with the treating agent. Many of the treating agents are immiscible with the oil, the emulsion, or the brine of the emulsion. Moreover, these oils and emulsions are generally sluggish or have a high viscosity, so that it is difficult to thoroughly distribute an immiscible treating agent through them.

Accordingly, one feature of the present invention contemplates the dehydration of oils with a treating agent which may be used in a gaseous form so as to be brought into direct contact with all of the emulsion in the oil body.

In the preferred form of the invention formaldehyde in a gaseous form is used as the dehydrating agent. The formaldehyde gas or vapor is generated by passing steam through a body of formalin or by heating paraformaldehyde, and the gas generated is carried into and distributed through a body of oil containing emulsion by high temperature steam. The steam is admitted under pressure, and in addition to carrying the formaldehyde gas into the oil, it assists in breaking the emulsion, in actively stirring the mixture, in decreasing the viscosity of the oil, and in lowering the surface tension of the water of the emulsion.

With this in view, another feature of the invention contemplates dehydrating oil with a gaseous dehydrating agent which is carried into and distributed through the oil by steam.

In the accompanying drawing is diagrammatically illustrated an apparatus in which the preferred method of the invention may be carried out.

To carry out the preferred method of the invention in the apparatus illustrated, oil containing the oil-water emulsion is pumped through a line 10 into a distributor 12 positioned within the common type of gun barrel tank 14. As the oil passes through the pipe 10 the treating agent comprising formaldehyde gas and steam is introduced into the pipe by means of a nozzle 16. The oil containing the oil-water emulsion and the treating agent passes through the distributor 12 and into the tank 14 at the bottom of which is a steam heating coil 18. A large portion of the emulsion is broken by the time the oil reaches the bottom of the gun barrel tank, and water settles out and is continuously withdrawn through an automatic syphon 20. The oil containing the unbroken emulsion rises to the top of the gun barrel tank, overflows through a pipe 22 and passes through a distributor 24 into the bottom of a heating tank 26. The oil leaving the distributor 24 comes directly into contact with a heating coil 28 in the lower portion of the tank 26 where the oil may be further heated to assist in breaking down the emulsion. By the time the oil and emulsion have reached the bottom of the tank 26, the emulsion is substantially all broken and any water which settles to the bottom of the tank may be withdrawn through an outlet 30. The oil along with any suspended emulsion overflows through a pipe 32 at the top of the tank 26 and passes into the bottom of a final settling tank 34. The vital separation of water and emulsion from the oil is effected in the tank 34. The clean oil leaves the top of the tank through a pipe 36 and passes to one or more stock tanks 38. Any water or emulsion which settles out of the oil in the tank 34 may be withdrawn through an outlet 40.

The formaldehye gas or vapor which is used for breaking the emulsion is preferably derived from formalin. The formalin is continuously supplied to a heating tank 42, in which it is gasified by means of steam which is introduced into the formalin by means of a steam distributing pipe 44 positioned in the bottom of the tank. The volume of liquid in the tank 42 is controlled by means of a float chamber 46 whereby a constant level of formalin is maintained in the tank 42. The volume of formalin in the float chamber is controlled by means of a float 48 which operates a valve 50 in a formalin inlet pipe 52.

The steam introduced into the pipe 44 is made to vary in accordance with the amount of oil flowing through the pipe 10, or the amount of oil to be dehydrated, and also in accordance with the character of the oil, the character of the emulsion, and the volume of the emulsion. For fresh oil being pumped from the well and containing from five to ten per cent emulsion, that is oil emulsified with a well water, ten pounds of formalin per one thousand barrels of oil is sufficient. If the percentage of emulsion is very high, or if the emulsion is of permanent form such as is found in the tank bottoms or in ponds, the amount of formalin necessary for breaking the emulsion has been found to be from 100 to 175 pounds to one thousand barrels of oil. The steam passing through the body of formalin in the tank 42 gasifies the formalin and carries the formaldehyde out of the tank through a pipe 56 which is connected with the nozzle 16. The volume of steam therefore introduced through the coil 44 will be that volume which is necessary to gasify the required volume of formalin in a unit of time, in accordance with the flow of the oil through the pipe 10. The steam used for dehydration is preferably held under pressure which may vary from 10 to 100 pounds per square inch. The high pressure steam is very effective in agitating the oil with the formaldehyde gas so as to bring the formaldehyde into contact with all of the emulsion in the oil. The steam also is very effective in heating the oil to decrease its viscosity, and lower the surface tension of the water of the emulsion. The amount of steam required for vaporizing the formalin is not sufficient to mix the oil and treating agent and to raise the oil to the desired temperature, and therefore steam from an inlet pipe 58 by-passes the coil 44 through a pipe 60, and is mixed with the steam containing formaldehyde vapor, which is flowing through the pipe 56. The amount of steam passing through a pipe 60 may vary in accordance with the character of the oil and emulsion, and the volume of emulsion in the oil. The high pressure steam possesses a large amount of potential heat which is very desirable in effectively heating the oil.

While it is desired to use formalin as a source of formaldehyde, it is not necessary to use formalin, but the formaldehyde may be derived from paraformaldehyde. If paraformaldehyde is used, the paraformaldehyde is placed in a heater, and the formaldehyde formed by heating the paraformaldehyde is withdrawn from the heater and introduced into the pipe 10 by means of the usual injector. In the place of formaldehyde, acetaldehyde may be used. This material, however, is too expensive for the usual commercial purposes, and does not seem to be much more effective than the commercial formaldehyde.

The action of formaldehyde in breaking the oil-water emulsion appears to be more of a physical nature than a true chemical reaction. It appears that the formaldehyde has a marked effect on the surface tension of the oil-water interface which allows the water to coalesce. The formaldehyde does not ionize in a water solution, and therefore the formaldehyde would not appear to act to neutralize the electrical charge of the disperse phase of an emulsion. It is also possible that the formaldehyde gas may act as a catalytic agent in breaking down the emulsion. The exact manner in which the formaldehyde acts in breaking down an emulsion is not understood, and therefore the invention is not based, dependent upon, or limited to any theory except as specifically defined in the accompanying claims.

In the claims the emulsions are referred to as comprising oil and water. By the term "water" it is intended to include the various brines or water solutions which are associated with oil in the petroleum industry to form emulsions. In referring to the treating agent as "formaldehyde" it is not to be understood that the formaldehyde is chemically pure, but the commercial form of formaldehyde gives very satisfactory results.

The preferred form of the invention having been thus described, what is claimed as new is:

1. A method of breaking an emulsion of petroleum oil and water comprising mixing formaldehyde with the emulsion.

2. A method of treating petroleum oil containing an emulsion of oil and water comprising distributing an aldehyde in a gaseous or vaporous form throughout the body of oil.

3. A method of treating petroleum oil containing an emulsion of oil and water comprising mixing formaldehyde and steam with the body of oil.

4. A method of treating petroleum oil containing an emulsion of oil and water comprising carrying an aldehyde in a vaporous or gaseous state into the body of oil by means of steam.

5. A method of treating petroleum oil containing an emulsion of oil and water comprising carrying an aldehyde in a vaporous or gaseous state into a body of oil by means of highly heated steam under pressure.

6. A method of treating petroleum oil containing an emulsion of oil and water comprising distributing through the body of oil by means of steam a gaseous material soluble in water but which does not ionize in water solution.

7. A method of treating petroleum oil containing an emulsion of oil and water comprising distributing vaporous or gaseous formaldehyde throughout the body of oil by means of steam in the proportion of 10 to 175 pounds of vaporous formalin to 1000 barrels of oil.

8. A continuous method of treating petroleum oil containing an emulsion of oil and water comprising continuously adding a mixture of steam and formaldehyde gas to a body of oil, circulating the oil through a series of bodies at a sufficiently slow rate of flow which will permit emulsions to settle therein, withdrawing water and partially broken emulsion from the bottom of the oil bodies, and continuously withdrawing the clean oil from the top of the bodies.

In testimony whereof I affix my signature.

JOHN CHARLES WALKER.